(12) United States Patent
Du et al.

(10) Patent No.: US 8,391,279 B2
(45) Date of Patent: Mar. 5, 2013

(54) MODEM AND CALLING PACKET PROCESSING METHOD THEREOF

(75) Inventors: Pu-Cun Du, Shanghai (CN); Bo Hong, Shanghai (CN); Yao-Shun Chuang, Tu-Cheng (TW)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 629 days.

(21) Appl. No.: 12/713,302

(22) Filed: Feb. 26, 2010

(65) Prior Publication Data

US 2010/0322232 A1    Dec. 23, 2010

(30) Foreign Application Priority Data

Jun. 18, 2009   (CN) .......................... 2009 1 0303396

(51) Int. Cl.
*H04L 12/66* (2006.01)
(52) U.S. Cl. ........ 370/352; 370/356; 370/353; 370/351; 370/401; 370/384; 370/354; 370/389; 370/315
(58) Field of Classification Search .......... 370/351–356, 370/315, 401, 389, 384
See application file for complete search history.

(56) References Cited

U.S. PATENT DOCUMENTS

| | | | |
|---|---|---|---|
| 6,295,293 B1 | 9/2001 | Tonnby et al. | |
| 6,307,845 B1 * | 10/2001 | Hummelgren et al. | 370/328 |
| 7,995,987 B2 * | 8/2011 | Yukie et al. | 455/403 |
| 8,098,651 B1 * | 1/2012 | Ramsayer et al. | 370/352 |
| 8,165,114 B2 * | 4/2012 | Halbraich et al. | 370/389 |
| 2003/0076817 A1 * | 4/2003 | Han | 370/352 |
| 2003/0076819 A1 * | 4/2003 | Emerson, III | 370/352 |
| 2005/0141531 A1 * | 6/2005 | Kinoshita et al. | 370/401 |
| 2005/0176473 A1 * | 8/2005 | Melpignano | 455/574 |
| 2005/0286466 A1 * | 12/2005 | Tagg et al. | 370/329 |
| 2009/0003322 A1 * | 1/2009 | Isumi | 370/352 |
| 2009/0219920 A1 * | 9/2009 | Brandstatter | 370/352 |
| 2010/0150143 A1 * | 6/2010 | Ku | 370/356 |
| 2010/0232593 A1 * | 9/2010 | Ku | 379/220.01 |

FOREIGN PATENT DOCUMENTS

| | | |
|---|---|---|
| TW | 330364 | 6/1997 |
| TW | 357514 | 6/1997 |

* cited by examiner

Primary Examiner — Asad M Nawaz
Assistant Examiner — Khaled Kassim
(74) Attorney, Agent, or Firm — Altis Law Group, Inc.

(57) ABSTRACT

A modem to process calling packets includes receiving a calling request packet from a software phone of a communication terminal, and determining if the calling request packet includes a special tag. If the IP phone is idle, the modem records a source IP address of the calling request packet, and modifies the source IP of the calling request packet to be an IP address of the IP phone, then the modem transmits the modified calling request packet to a server, and receives a calling reply packet from the server, then modifies a destination IP address of the calling reply packet to be the IP address of the communication terminal. The modem transmits the modified calling reply packet to the software phone to establish the call.

13 Claims, 4 Drawing Sheets

MODEM AND CALLING PACKET PROCESSING METHOD THEREOF

BACKGROUND

1. Technical Field

Embodiments of the present disclosure relate to network communications, and more particularly to a modem and calling packet processing method thereof.

2. Description of Related Art

A cable modem usually provides at least two ports for an IP phone and a computer, respectively, to communicate with a server. The computer comprises a software phone to establish a call. The modem processes calling packets from the IP phone or from the software phone.

The IP phone has a fixed telephone number for placing or receiving VoIP calls. However, if a user wants other functions included with their IP phone such as recording calls, voice mail, and other multimedia functions, the IP phone may be expensive. In comparison, the software phone will include those multimedia functions at little or no extra cost. However, the software phone usually does not have a fixed telephone number to receive VoIP calls. Therefore, a need exists for the modems that can allow the software phone to employ the fixed telephone number of the IP phone when making and receiving VoIP calls.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
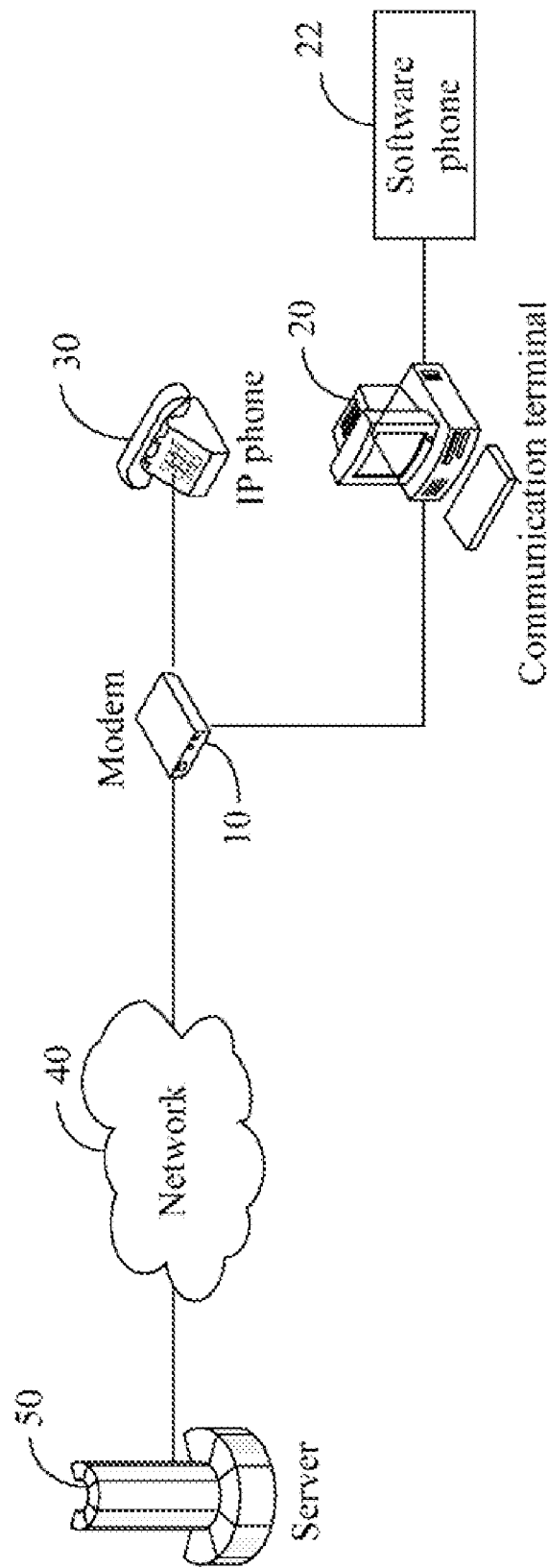
FIG. 1 shows an application environment of a modem of one embodiment of the present disclosure.

FIG. 1 shows an application environment of a modem 10 of one embodiment of the present disclosure. The modem 10 connects to a communication terminal 20 and an IP phone 30 with a server 50 via a network 40. A software phone 22 is installed in the communication terminal 20, and the software phone 22 and the communication terminal 20 share one IP address. The software phone 22 and the IP phone 30 communicate with the server 50 by sending and receiving calling packets via the modem 10 and the network 40. The calling packet includes calling request packets and calling reply packets. In one embodiment, the software phone 22 communicates with the server 50 according to the media gateway control protocol (MGCP), and the IP phone 30 communicates with the server 50 according to the Session Initiation Protocol (SIP).

The modem 10 processes the calling packets from the software phone 22, the IP phone 30 and the server 50. In one embodiment, the communication terminal 20 may be a personal computer. The communication terminal 20 and the IP phone 30 respectively have an IP address. In other embodiments, more than one IP phone 30 may be connected to the modem 10, and the plurality of IP phones 30 share one IP address, and have different phone numbers and communication lines.

Figure 2:
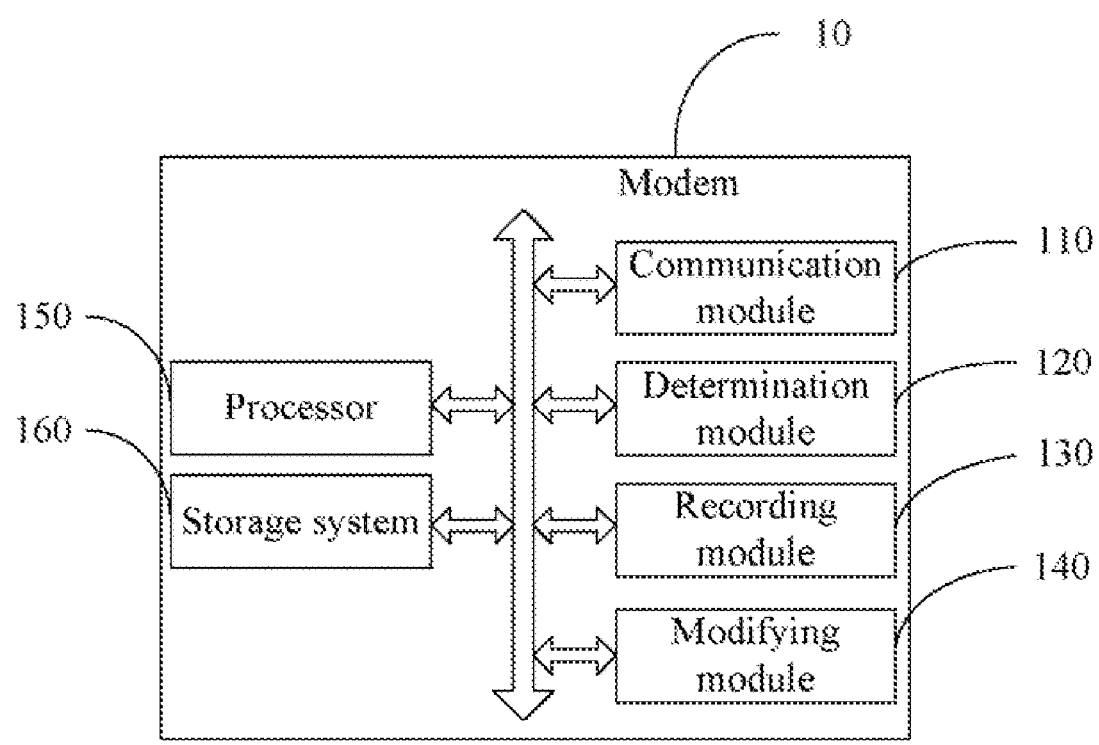
FIG. 2 shows a schematic diagram of functional modules of the modem of one embodiment of the present disclosure.

FIG. 2 shows a schematic diagram of functional modules of the modem 10 of one embodiment of the present disclosure. In one embodiment, the modem 10 includes a communication module 110, a determination module 120, a recording module 130, a modifying module 140, at least one processor 150, and a storage system 160. The modules 110-140 may include one or more computerized instructions stored in the storage system 160 and executed by the at least one processor 150.

In one embodiment, the software phone 22 transmits a calling request packet to the server 50 to establish a call. The communication module 110 receives the calling request packet from the software phone 22. In one embodiment, the calling request packet comprises a special tag, a source IP address and a port number. The source IP address is the IP address of the communication terminal 20.

The special tag indicates that the software phone 22 is required to establish the call by employing the telephone number of the IP phone 30. In one embodiment, the special tag can be set. For example, if the communication terminal 20 employs the telephone number of the IP phone 30 to place a call, then a string "#000#" should be added in front of the dialed phone number. Thus the string "#000#" is a special tag for the calling request packet. The determination module 110 determines if the calling request packet includes the special tag.

The communication module 110 processes the calling request packet according to the Session Initiation Protocol (SIP) upon the condition that the calling request packet does not include the special tag. The determination module 110 determines if the IP phone 30 is idle upon the condition that the calling request packet includes the special tag. The recording module 130 records a source IP address and a source port number of the calling request packet upon the condition that the IP phone 30 is idle.

Subsequently, the modifying module 140 modifies the source IP address of the calling request packet to be the IP address of the IP phone 30. The communication module 110 transmits the modified calling request packet to the server 50.

The server 50 receives the modified calling request packet, and transmits the modified calling packet to a phone which the software phone 22 calls and transmits a calling reply packet that includes a destination IP address corresponding to the calling request packet to the communication module 110 at the same time. The modifying module 140 modifies the destination IP address of the calling reply packet to be the IP address of the communication terminal 20, then the communication module 110 transmits the modified calling reply packet to the software phone 22 to establish the call by employing the telephone number of the IP phone 30. Thus, the software phone 22 can establish a call via the fixed telephone number of the IP phone 30.

The communication module 110 either receives and transmits the calling packets from the communication terminal 20 and the IP phone 30, or receives and transmits the calling packets from the server 50. If the IP phone 30 is called by other phones served by the server 50, then the communication module 110 receives a calling request packet from the server 50.

In one embodiment, the determination module 120 further determines if the IP phone 30 is idle upon the condition that the communication module 110 receives the calling request packet from the server 50. In one embodiment, the determination module 120 further determines if the software phone 22 is idle upon the condition that the IP phone 30 is idle.

In one embodiment, the modifying module 140 modifies the destination IP address of the calling request packet to be the IP address of the communication terminal 20, the communication module 110 transmits the modified calling request packet to the software phone 22. The communication module 110 further receives a calling reply packet corresponding to the calling request packet from the software phone 22.

In one embodiment, the communication module 110 transmits the unmodified calling request packet to the IP phone 30 at the same time. Thus, the software phone 22 and the IP phone 30 can receives the calling request packet from the server 50 at the same time, the user can select one to answer the call.

The modifying module 140 further modifies the source IP address of the calling reply packet to be the IP address of the IP phone 30 corresponding to the modified calling request packet. The communication module 110 further transmits the modified calling reply packet to the server 50 to establish the call.

The software phone 22 can employ the telephone number of the IP phone 30 to give or receive VoIP calls because the modem 10 modifies the IP address of the calling packet which includes the special tag. In addition, VoIP calls of the IP phone 30 can also be recorded and the background music of the VoIP calls can be defined by the software phone 22 because the communication terminal 20 has multimedia functions. Therefore, an IP phone with multimedia functions, which is typically more expensive, is not required.

Figure 3:
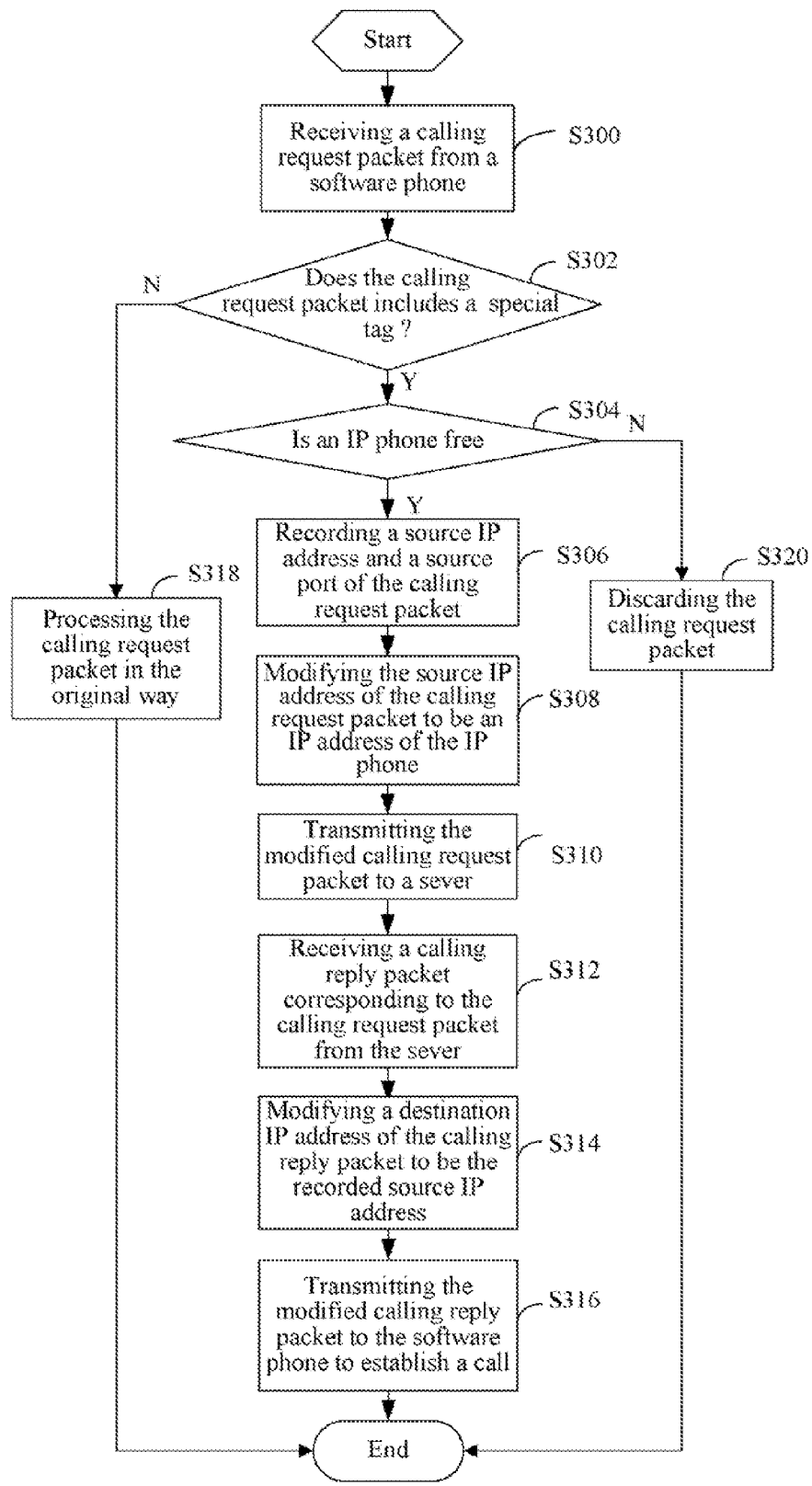
FIG. 3 is a flowchart of calling packet processing method of one embodiment in accordance with the present disclosure.

FIG. 3 is a flowchart of calling packet processing method of one embodiment in accordance with the present disclosure. The method is applied in the modem 10, such as that of FIG. 1 and FIG. 2, and is executed by functional modules such as those of FIG. 2. Depending on the embodiment, additional blocks may be added, others deleted, and the ordering of blocks may be changed while remaining well within the scope of the disclosure. For the software phone 22 to employ a fixed telephone number of the IP phone 30 to place a call, the calling packet processing method is performed.

In block S300, the communication module 110 receives a calling request packet from the software phone 22. In one embodiment, the calling request packet includes a source IP address, a port number, and a special tag. In one embodiment, the source IP address is an IP address of the communication terminal 20.

In one embodiment, the special tag can be set. For example, if the software phone 22 employs telephone number of the IP phone 30 to dial a phone number, then a string "*000*" should be added in front of the dialed phone number. Thus the string "*000*" is a special tag for the calling request packet.

In block S302, the determination module 120 determines if the calling request packet includes the special tag.

If the calling request packet includes the special tag, then in the block S304, the determination module determines if the IP phone 30 is idle.

If the IP phone 30 is idle, the in the block S306 the recording module 120 records the source IP address and the source port of the calling request packet. In one embodiment, the source IP address of the recording module 130 recorded is the IP address of the communication terminal 20, and the function of the recording module 130 records the source port and the source IP address is that the modifying module 140 can modify the IP address of the calling packet, and the communication module 110 can transmit the modified calling packet to the port of the software phone 22.

In block S308, the modifying module 140 modifies the source IP address of the calling request packet to be the IP address of the IP phone 30.

In block S310, the communication module 110 transmits the modified calling request packet to the server 50. In one embodiment, the server 50 receives the modified calling request packet, and transmit the modified calling packet to a phone which the software phone 22 calls and transmits a calling reply packet includes a destination IP address corresponding to the calling request packet to the communication module 110 at the same time.

In block S312, the communication module 110 receives the calling reply packet corresponding to the calling request packet from the server 50.

In block S314, the modifying module 140 modifies the destination IP address of the calling reply packet from the server 50 to be the IP address recorded by the recording module 140.

In the block S316, the communication module 110 transmits the modified calling reply to the software phone 22 according the source port number recorded by the recording module 140 to establish the call.

If the calling request packet does not include the special ID, then in block S318, the modem 10 processes the calling request packet in the original way. In one embodiment, the original way is that the modem 10 processes the calling request packet according to SIP.

If the IP phone is not idle, but in work (e.g. in communication with another device), then in block S320, the communication module 110 discards the calling request packet.

Figure 4:
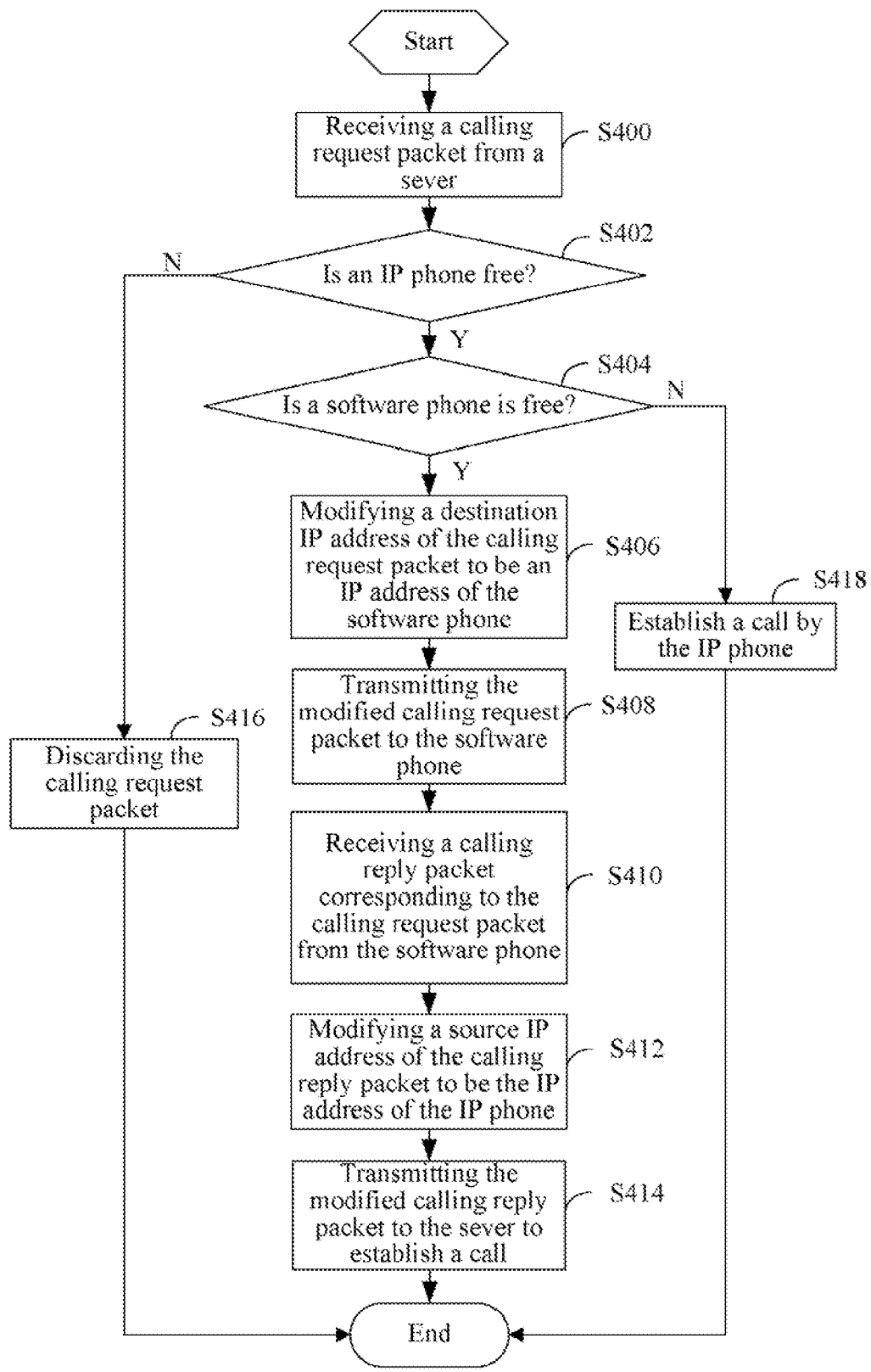
FIG. 4 is a flowchart of calling packet processing method of another embodiment in accordance with the present disclosure.

FIG. 4 is a flowchart of calling packet processing method of another embodiment in accordance with the present disclosure. The method is applied in the modem 10, such as that of FIG. 1 and FIG. 2, and is executed by functional modules such as those of FIG. 2. Depending on the embodiment, additional blocks may be added, others deleted, and the ordering of blocks may be changed while remaining well within the scope of the disclosure.

In block S400, the communication module 110 receives a calling request packet from the server 50. In one embodiment, the calling request packet includes a destination IP address.

In block S402, the determination module 120 determines if the IP phone 30 is idle.

If the IP phone 30 is idle, then in block S404, the determination module 120 determines if the software phone 22 is idle.

If the software phone 22 is idle, then in block S406, the modifying module 130 modifies the destination IP address of the calling request packet to be the IP address of the communication terminal 20.

In block S408, the communication module transmits the modified calling request packet to the software phone 22, and transmits the unmodified calling request packet to the IP phone 30 at the same time. Thus the software phone 22 and the IP phone 30 can ring at the same time, thus users can select one of them to answer the phone.

In block S410, the communication module 110 receives a calling reply packet corresponding to the calling request packet from the software phone 22. In one embodiment, the calling reply packet includes a source IP address.

In block S412, the modifying module 130 modifies the source IP address of the calling reply packet to be the IP address of the IP phone 30.

In block S414, the communication module 110 transmits the modified calling reply packet to the server 50 to establish the call.

If the IP phone 30 is not idle, but in work, then in block S416, the communication module 110 discards the calling request packet.

If the software phone 22 is not idle, then in block S418, the modem 10 establishes the call by the IP phone 30.

The software phone 22 can employ the telephone number of the IP phone 30 to give or receive VoIP calls because the modem 10 modifies the IP address of the calling packet which includes the special ID. In addition, VoIP calls of the IP phone 30 can also be recorded and the background music of the VoIP calls can be defined by the software phone 22 because the communication terminal 20 has multimedia function. Therefore, an IP phone with multimedia function which is much more expensive is not required.

While various embodiments and methods of the present disclosure have been described above, it should be understood that they have been presented by way of example only and not by way of limitation. Thus, the breadth and scope of the present disclosure should not be limited by the above-described exemplary embodiments, but should be defined only in accordance with the following claims and their equivalents.

What is claimed is:

1. A modem connecting a communication terminal and an IP phone with a server, the communication terminal comprising a software phone, the modem comprising a processor, a memory, and one or more programs, wherein the one or more programs are stored in the memory and operable to be executed by the processor, the programs comprising:
   a communication module receiving a calling request packet from the software phone, wherein the calling request packet comprises a special tag, a source IP address and a source port number, the source IP address is an IP address of the communication terminal, the special tag indicating that the software phone is required to establish a call by employing a telephone number of the IP phone;
   a determination module determining if the calling request packet comprises the special tag, and determine if the IP phone is idle upon the condition that the calling request packet comprises the special tag;
   a recording module recording the IP address and the port number of the calling request packet upon the condition that the IP phone is idle;
   a modifying module modifying the source IP address of the calling request packet to be an IP address of the IP phone;
   wherein the communication module further transmits the modified calling request packet to the server, and receives a calling reply packet comprising a destination IP address corresponding to the calling request packet from the server, the modifying module further modifies the destination IP address of the calling reply packet to be the IP address of the communication terminal, the communication module further transmits the modified calling reply packet to the software phone so as to establish the call, and the modifying module further modifies the destination IP address of the calling request packet from the server to be the IP address of the communication terminal upon the condition that the IP phone is idle.

2. The modem as claimed in claim 1, wherein the communication module further discards the calling request packet upon the condition that the IP phone is in work.

3. The modem as claimed in claim 1, wherein the communication module further receives a calling request packet including a destination IP address from the server.

4. The modem as claimed in claim 3, wherein the determination module further determines if the IP phone is idle upon the condition that the communication module receives the calling request packet from the server.

5. The modem as claimed in claim 4, wherein the determination module further determines if the software phone is idle upon the condition that the IP phone is idle.

6. The modem as claimed in claim 1, wherein the communication module further transmits the modified calling request packet to the software phone, and receives a calling reply packet corresponding to the calling request packet from the software phone, wherein the calling reply from the software phone packet comprises a source IP address.

7. The modem as claimed in claim 1, wherein, the modifying module further modifies the source IP address of the calling reply packet from the software phone to be the IP address of the communication terminal.

8. The modem as claimed in claim 6, wherein, the communication module further transmits the modified calling reply packet to the server to establish the call.

9. A method to process calling packets by a modem, wherein the modem communicates with a communication terminal comprising a software phone, a IP phone and a server, the method comprising:
   receiving a calling request packet from the software phone, wherein the calling packet comprises a special tag, a source IP address and a source port number, the source IP address is an IP address of the communication terminal, the special tag indicating that the software phone is required to establish a call by employing a telephone number of the IP phone;
   determining if the calling request packet comprises the special tag, and determine if the IP phone is idle if the calling request packet comprises the special tag;
   recording the source IP address and the source port of the calling packet if the IP phone is idle;
   modifying the source IP address of the calling packet to be a IP address of the IP phone;
   transmitting the modified packet to the server;
   receiving a calling reply packet comprising a destination IP address corresponding to the calling request packet from the server;
   modifying the destination IP address of the calling reply packet to be the IP address of the communication terminal;
   modifying the destination IP address of the calling request packet to be the IP address of the communication terminal upon the condition that the IP phone is idle; and
   transmitting the modified calling reply packet to the software phone to establish the call by employing a telephone number of the IP phone.

10. The method as claimed in claim 8, further comprising the following steps:
    discarding the calling request packet if the IP phone is busy.

11. The method as claimed in claim 8, further comprising the following steps:
    receiving a calling request packet from the server, wherein the calling request packet comprise a destination IP address;

determining if the IP phone is idle;

determining if the software phone is idle if the IP phone is idle; and transmitting the modified calling request packet to the software phone.

12. The method as claimed in claim 11, further comprising the following steps:

receiving a calling reply packet comprising a source IP address corresponding to the calling request packet from the software phone;

modifying the source IP address of the calling reply packet to be a IP address of the IP phone; and transmitting the modified calling reply packet to the server to establish a call by employing a telephone number of the IP phone.

13. The method as claimed in claim 12, further comprising the following steps:

discarding the calling request packet if the IP phone is in work.

* * * * *